United States Patent

Bainbridge et al.

[19]

[11] Patent Number: 6,014,700
[45] Date of Patent: Jan. 11, 2000

[54] WORKLOAD MANAGEMENT IN A CLIENT-SERVER NETWORK WITH DISTRIBUTED OBJECTS

[75] Inventors: Andrew John Bainbridge, Winchester; Stephen James Cocks, Chandlers Ford, both of United Kingdom; Donald Francis Ferguson, Yorktown Heights, N.Y.; Thomas Freund, Winchester, United Kingdom; Avraham Leff, New Hempstead, N.Y.; Glyn Normington, Winchester, United Kingdom; James Thomas Rayfield, Ridgefield, Conn.; Robert Anthony Storey, Southampton, United Kingdom

[73] Assignee: International Business Machines Corporation, Armonk, N.Y.

[21] Appl. No.: 08/853,102

[22] Filed: May 8, 1997

[51] Int. Cl.[7] .............................. G06F 13/38; G06F 15/17
[52] U.S. Cl. ........................ 709/226; 709/104; 709/303
[58] Field of Search ...................................... 709/203, 201, 709/303, 226, 235, 241, 245, 104, 105

[56] References Cited

U.S. PATENT DOCUMENTS 5,504,894  4/1996  Ferguson et al. .
5,838,970  11/1998  Thomas .................................. 709/303
5,887,168  3/1999  Bahls et al. .
5,903,725  5/1999  Colyer ................................... 709/303

OTHER PUBLICATIONS

Merle, P. et al., "CorbaWeb: A generic object navigator"; *Computer Networks and ISDN Systems;* pp. 1269–1281; 1996.
S. Maffeis, "The Object Group Design Pattern", Proceedings of the USENIX Conference on Object–Oriented Technologies, Toronto, Jun. 1996.

*Primary Examiner*—Mark H. Reinhart
*Attorney, Agent, or Firm*—Kevin M. Jordan

[57] ABSTRACT

A method of performing workload management within an object-oriented client/server computing environment wherein one of a plurality of servers is chosen to satisfy a client request based on at least one workload management policy, said method, which takes place within the client, includes steps of: deciding whether a client application program has issued a request for a server to do some work; forming an extended object reference based on said request, said extended object reference having, in addition to a server address field and an object key field, at least one additional field; accessing workload management policy data based on said extended object reference; and selecting one of said plurality of servers based on said accessed workload management policy data.

17 Claims, 5 Drawing Sheets

|  | Server | | |
|---|---|---|---|
|  | 1 | 2 | 3 |
| rr method | 0 | 1 | 2 |
| w/sep for Jim | 0 | 0 | 0 |
| combined rank | 0 | 1 | 2 |

Fig. 5

WORKLOAD MANAGEMENT IN A CLIENT-SERVER NETWORK WITH DISTRIBUTED OBJECTS

FIELD OF THE INVENTION

The present invention relates to the field of client/server (also known as "distributed") computing, where, for example, one computing device ("the client") requests another computing device ("the server") to perform part of the client's work.

BACKGROUND OF THE INVENTION

Client/server computing has become more and more important over the past few years in the information technology world. This type of distributed computing allows one process (a "client") running on a machine to delegate some of its work to another process (a "server") running on another machine that might be, for example, better suited to perform that work. The client and server might also be two processes running on the same physical machine.

The benefits of client/server computing have been even further enhanced by the use of a well-known computer programming technology called object-oriented programming (QOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example, of the basic architecture will be given below for contextual understanding of the invention's environment. In this example, the client and server are on different machines, but, the same software architecture applies if they are on the same machine.

Figure 1:
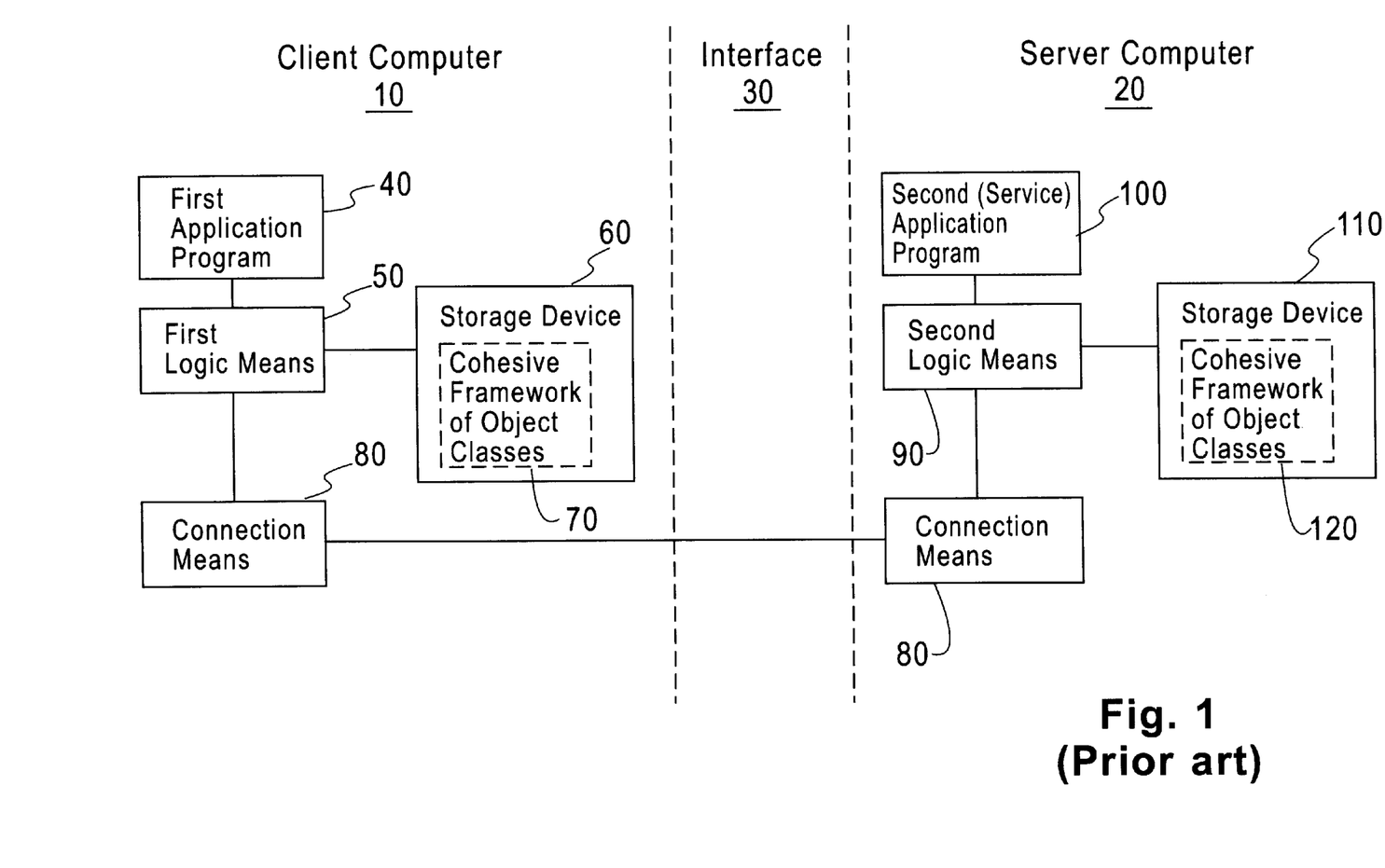
FIG. 1 is a block diagram of a well-known heterogeneous client/server architecture using object technology, in the context of which the present invention can be applied.

As shown in FIG. 1, the client computer 10 (which could, for example, be a personal computer having the IBM OS/2 operating system installed thereon) has an application program 40 running on its operating system ("IBM" and "OS/2" are trademarks of the International Business Machines Corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system. For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of finding and establishing the necessary communications with the second computer 20 with reference to definitions of the available communications services stored in the storage device 60. All the possible services are defined as a cohesive framework of object classes 70. During this process, the first logic means 50 determines an object reference which has one component (the server address) identifying the server computer 20 and another component (the object key) identifying the particular server object located on server computer 20. Defining the services in this way gives rise to a great number of advantages in terms of performance and reusability.

To establish the necessary communication with the server 20, the first logic means 50 determines which 50 object class in the framework needs to be used, and then creates an instance of that object, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms as is shown in FIG. 1. The OMG has set forth published standards by which clients (e.g. 10) communicate (in OOP form) with servers (e.g. 20). As part of these standards, an Object Request Broker has been defined (known as the Common Object Request Broker Architecture, or CORBA for short), which provides the object-oriented bridge between the client and the server. The ORB decouples the client and server applications from the object oriented implementation details, performing at least part of the work of the first and second logic means 50 and 90 as well as the connection means 80.

Oftentimes, duplication of server resources (in the form of plural servers) is provided to enable "the server" to handle a large number of simultaneous client requests and to provide for fault tolerance (if one server is defective another can "step in" and take over). The clients think they are communicating with a single "server", but in fact, a plurality of servers are actually handling the requests (these servers could be located on separate machines, or they could be separate processes running on the same machine). In this context, client requests destined for "the server" are directed to a central gateway (common to all of the server machines making up "the server") which performs workload management and load balancing to distribute client requests to the various servers according to any well-known workload balancing policy (or combination of a plurality thereof), such as the round robin by method policy, where each server is assigned a request in turn. The specific details of the balancing policy/policies to be used are selected by the person configuring "the server" system architecture, typically a systems administrator.

A major problem with this type of approach is that all client request traffic on its way to "the server" must first pass through the gateway, which is, in essence, a bottleneck. Thus, if client request traffic destined for "the server" increases, it may take a considerable amount of time for a request to make its way through the gateway and into one of the plurality of servers located behind the gateway. The clients are thus made to wait to get an answer from a server for a period of time that may be unacceptable, especially as the number of clients that may wish to gain access to a server continues to increase.

A second problem is that should the gateway fail for some reason, no client requests will be serviced. In other words, the gateway is a single point of failure which, if it fails, will prevent the rest of the system from continuing operation.

SUMMARY OF THE INVENTION

According to a first aspect, the present invention provides, a method of performing workload management within an object-oriented client/server computing environment wherein one of a plurality of servers is chosen to satisfy a client request based on at least one workload management policy, said method, which takes place within the client, including steps of: deciding whether a client application program has issued a request for a server to do some work; forming an extended object reference based on said request, said extended object reference having, in addition to a server address field and an object key field, at least one additional field; accessing workload management policy data based on said extended object reference; and selecting one of said plurality of servers based on said accessed workload management policy data.

Preferably, said extended object reference includes a server group identifier and a policy group identifier, wherein said policy group identifier identifies said at least one workload management policy, and wherein said selecting step involves instantiating an object for each workload management policy identified by said policy group identifier.

According to a second aspect, the invention provides a computer-readable memory comprising a data structure for an object reference for use in an object-oriented client/server computing system, said data structure comprising:

a server address field;

an object key field;

a server group identifier field; and a policy group identifier field.

Preferably, said server group identifier field identifies a group of servers, each server of said group capable of satisfying a particular client request associated with said object reference, and said policy group identifier field identifies at least one workload management policy for selecting one server in said group of servers to satisfy said client request.

According to a third aspect, the invention provides a computer program product stored on a computer readable storage medium at a client end of an object-oriented client/server computing system, said computer program product comprising: client application program means for performing a client-side work item, and, in the process of which, making a client request for a server to perform at least part of said work item; proxy object means for forming a proxy object in response to said client request; object request broker means for communicating said client request from said proxy object to a server object; and server groups unit means for receiving an extended object reference from said object request broker means, using workload management policy data identified in said extended object reference to select a server from a group of servers, and informing said object request broker means of the selected server.

Preferably, said extended object reference includes:

a server address field;

an object key field;

a server group identifier field; and a policy group identifier field.

Further preferably, said server group identifier field identifies said group of servers, said policy group identifier field identifies at least one workload management policy for use by said server groups unit means in selecting a server in said group of servers to satisfy said client request, and said server groups unit means instantiates an object for each policy identified by said policy group identifier, while selecting a server in said group of servers to satisfy said client request.

According to a fourth aspect, the invention provides a client computer device for use in an object-oriented client/server computing system, said computer device comprising: client application program means for performing a client-side work item, and, in the process of which, making a client request for a server to perform at least part of said work item; proxy object means for forming a proxy object in response to said client request; object request broker means for communicating said client request from said proxy object to a server object; and server groups unit means for receiving an extended object reference from said object request broker means, using workload management policy data identified in said extended object reference to select a server from a group of servers, and informing said object request broker means of the selected server.

Preferably, said extended object reference includes:

a server address field;

an object key field;

a server group identifier field; and a policy group identifier field.

Further preferably, said server group identifier field identifies said group of servers, said policy group identifier field identifies at least one workload management policy for use by said server groups unit means in selecting a server in said group of servers to satisfy said client request, and said server groups unit means instantiates an object for each policy identified by said policy group Ldentifier, while selecting a server in said group of servers to satisfy said client request.

By enlarging the object reference (beyond its usual server address and object key portions) to include extra information concerning the identification of a group of servers and the identification of at least one workload balancing policy, a client is able to perform workload balancing locally and to then send a request directly to a specific server included within the group of servers instead of first sending the request to a central gateway (router) at the server end for performing workload balancing. This removes the bottleneck that was experienced in the prior art, thus making server response time for a particular client much faster. Also, the "single point of failure" problem is solved, as there is no need for all requests to pass through a central router.

DETAILED DESCRIPTION OF THE PREFERRED EMBODIMENTS

Figure 2:
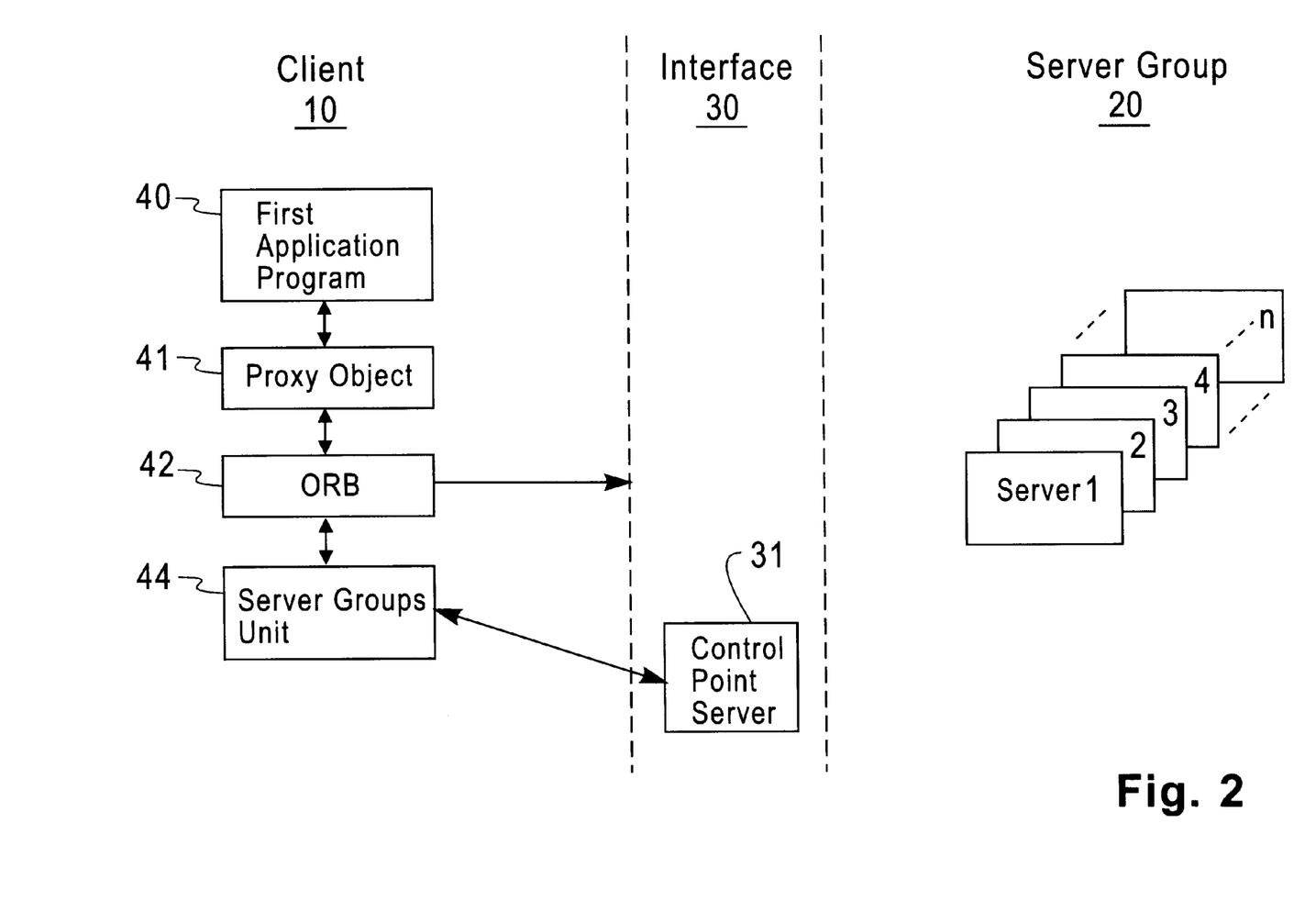
FIG. 2 is a block diagram showing the software elements of the client according to a preferred embodiment of the present invention, along with the interface and server side.

The server group 20 of FIG. 2 contains a plurality of servers 1-n, each of which is provided for serving client requests, as explained above. The client 10 of FIG. 2 is similar to that shown in FIG. 1, but further includes a server groups unit 44 (an extra software layer located on the client computer 10). A control point server 31 (extra software layer) is also provided at, preferably, an intermediate server machine connected to the network (interface 30) so that it can be shared by many different client computers wishing to access the same server group 20.

The prior art configuration of a client of FIG. 1 included only the first application 40, proxy object 41 and ORB 42 (the latter two elements correspond to the elements 50, 60, 70 and 80 of FIG. 1). In this prior art configuration, when the first application program 40 wished to have a server do part of its work, it sent a message specifying what it wanted done to the proxy object 41. Proxy object 41 formed an object reference from the request and passed this object reference to the ORB 42 which used the server address included within the object reference to specify the gateway address (the address of the router which channelled all requests to its associated group of servers, after performing the necessary workload balancing according to predefined policies.) The object reference also included the object key, which identified which server object should be invoked to process the client request (each of the servers in the group has this server object and is thus capable of satisfying the request). As explained above, directing all client requests to a router caused problems in terms of creating a bottleneck and a single point of failure.

By extending the object reference as will be described below, Applicant is able to direct client requests, at the client, to a specific server within a group of servers, so that upon leaving the client, the request goes directly to one of the servers in the group without first passing through a common central point (such as a router). Workload balancing is, instead, done at the client before the request ever leaves the client.

Specifically, when first application program 40 wishes to make a remote procedure call to request that work be done by a server (step 401 of FIG. 4), it sends a message to the proxy object 41 informing the proxy object of what work it wants done by a server. Proxy object 41, in conjunction with ORB 42, forms an object reference (step 402).

The object reference (32 in FIG. 3A) that is formed contains additional components: a server group identifier (313a) which identifies a server group should be used to satisfy the client request, and a policy group identifier (314a) which identifies a group of policies to be used in determining which server computer of said group should be selected to do the requested work. The usual object reference fields: server address 311a and object key 312a are also provided. Server address field 311a is initially filled in with the address of a router associated with the group of servers as was discussed above in the context of the prior art. This allows clients with no server groups unit 44 to still use the object reference to route client requests to a server group through an intermediate server-end router (albeit with the bottleneck problems discussed above). The object key 312a is filled in with the identifier of the object which should be invoked on the server machine that is eventually selected to process the request.

The ORB 42 passes (step 403) this enlarged object reference 32 to the server groups unit 44, which is an added software layer sitting on top of the standard ORB 42. Each of the software elements 40, 41, 42 and 44 are stored on computer readable storage media (such as semiconductor memory or a magnetic hard drive) accessible to the client. Server groups unit 44 uses the server group identifier (having the value SG1 in the example object reference of FIG. 3A) and the policy group identifier (having the example value PG1) to access details of the policies, stored at the control point server 31 (step 404), which is located by the client via the CORBA name space (there could be multiple control point servers per server group to avoid a single point of failure). Such details are transferred into the client computer 10 and stored in a cache memory therein. A class name is associated with each policy, and the server groups unit 44 instantiates (step 405) an object (an instance) for each policy class name. The server groups unit 44 then calls (step 406) each policy object instance in turn and runs its respective workload balancing operation in accordance with its predefined policies and then selects a particular server computer in the server group based on a combination of the results of processing from each policy object.

The server groups unit 44 then returns (steps 407 and 408) a modified object reference 33 (see FIG. 3B) to ORB 42 specifying (in the server address field 311b) exactly which server computer 1-n of server group 20 should be used to satisfy the client request (in the example, server computer 1 is selected). ORB 42 then sends out the request to the particular server computer 1-n selected according to the policies.

Example 1

Figure 3A:
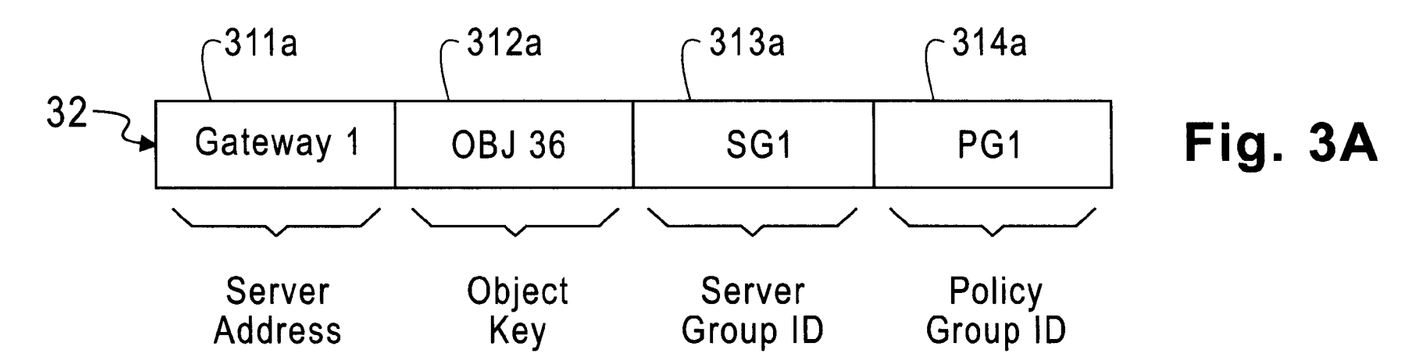
FIGS. 3A and 3B show an object reference format according to a preferred embodiment of the present invention.
Figure 3B:
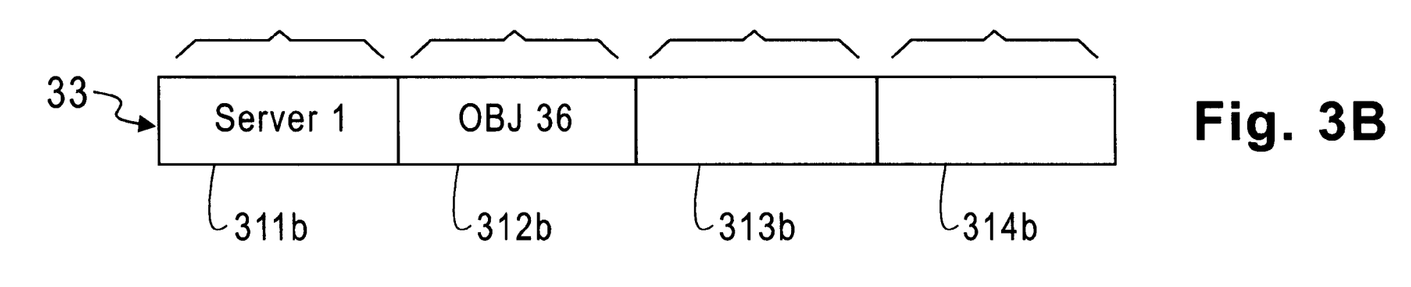

To illustrate the above more fully, an example will now be described, using the values of the object reference fields already filled in in FIGS. 3A and 3B.

Server group id (313a) has the value "SG1" and policy group id (314a) has the value "PG1". Server groups unit 44, accordingly, accesses control point server 31 using these two id values and retrieves the following data therefrom:

SG1=<server1, server2, server3>PG1=<rrmethod, w/sep>

The server computer members of the server group identified by SG1 include server1, server2 and server3 (i.e., n=3 in FIG. 2). The members of the policy group identified by PG1 include rrmethod (round robin by method) and w/sep (workload separation). The round robin by method policy means that one server in the group is provided with a first request and a next request is provided to the next server in the group etc. The workload separation policy means that server machines are pre-allocated to certain users, with higher priority users being given access to more server machines. In this example, a first user, TEST, is assigned only to server 1, while a higher priority user, JIM, is assigned to all three servers. These policies and their implementations are well known to skilled artisans.

Server groups unit 44 then instantiates a first policy object for the rrmethod class and a second policy object for the w/sep class. The class names were obtained from control point server 31 using the identifiers in the object reference. These objects are then called (by server groups unit 44) to operate on the server and policy group data as follows.

Figure 5:
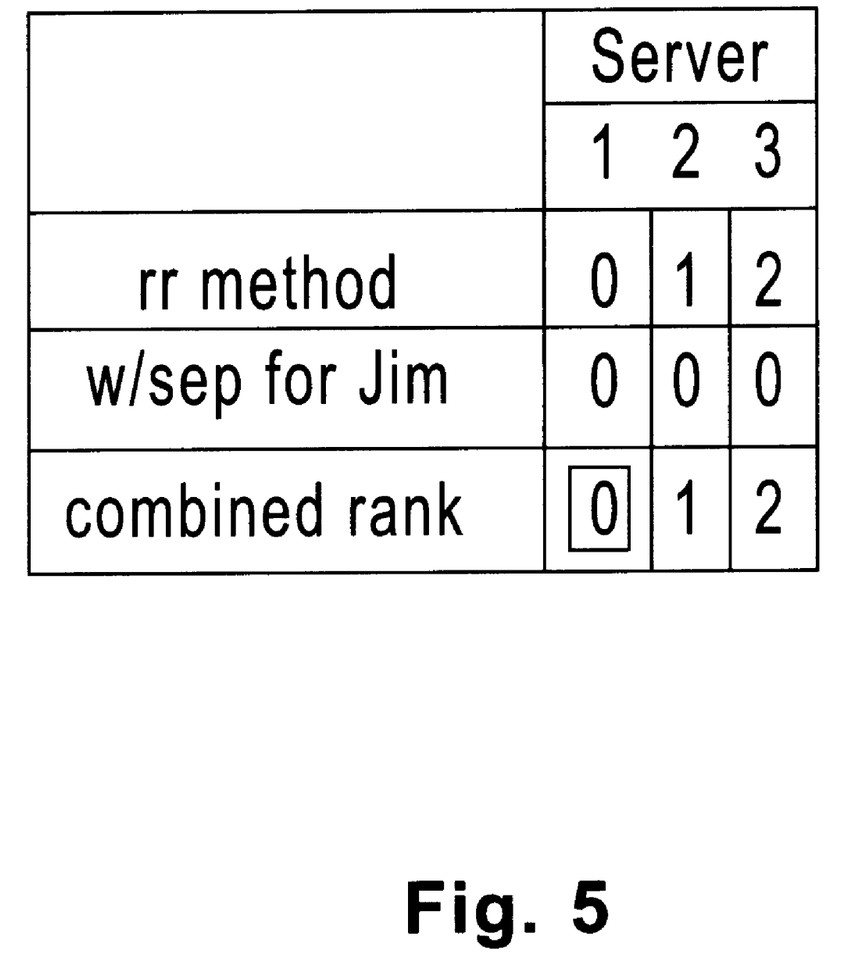
FIG. 5 is a table showing server rankings according to policies, and is used in Example 1 illustrating the steps taken in FIG. 4 according to a preferred embodiment of the present invention.

As shown in the chart of FIG. 5, the server groups unit 44 first calls the rrmethod policy object and asks this object to rank each of the three servers. This is a preliminary decision of which server to choose, taking into account only the first policy (rrmethod). Server 1 is given a rank of 0 because, according to the round robin method, the first server is selected first (a low rank, in this example, is highest priority). The other two servers are ranked with successively higher ranks indicated their successive diminishment in priority according to the round robin method.

Then, the server groups 44 calls the w/sep object and asks this object to rank each of the three servers (we will use the user JIM in this example). As JIM is such a high priority user (e.g., he is the president of the company) each of the servers is high priority for him, so ranks of 0 are entered in the table for each server.

Next, the server groups 44 adds up the columns in the table to obtain a combined rank, which takes into account both policies. In the example of FIG. 5, server1 is selected because it has the lowest combined rank (a rank of 0) and thus is taken to have the highest priority as compared to the other servers (server2 and server3) which have higher ranks (1 and 2 respectively).

Accordingly, server groups unit 44 adds the designation "server1" into the server address field 311*b* of object reference 33 and sends this object reference 33 to the ORB 42, which, in turn, sends the request out to server computer 1, directly, without going through a preliminary router.

In this way, other client computers who have selected a different server computer (e.g., server computer 4) can send a request directly to server computer 4 and these two requests will not have to pass through the same central router in order to arrive at their respective destinations. Accordingly, the bottleneck problem of the prior art is solved. Also, should one part of the server group 20 become defective (e.g., server computer 1) this does not effect the other request which is going directly to server computer 4. That is, a single point of failure does not negatively impact the entire server group.

Also, since a policy group id is contained in the object reference at the client, each client can use its own policies, giving great flexibility at the client end. Further, each object (pointed to by the object key) can easily be assigned its own policy group. Thus, the policies in the policy group can be specially written taking into account only the object(s) to which it will be assigned. This avoids the need for a single policy to necessarily be able to cope with a large number of different work load management considerations, i.e., the work load management problem can be divided between multiple policies. No single policy need be a single point of failure.

Example 2

In a second example, the policy group identifier PG1 points to a policy group having no members. That is, it is not always required that a policy group identified by the policy group identifier in the extended object reference have members listed. The server groups unit could go to the control point server 31 using PG1 from the object reference and find that there are no policies included for this policy group.

Figure 4:
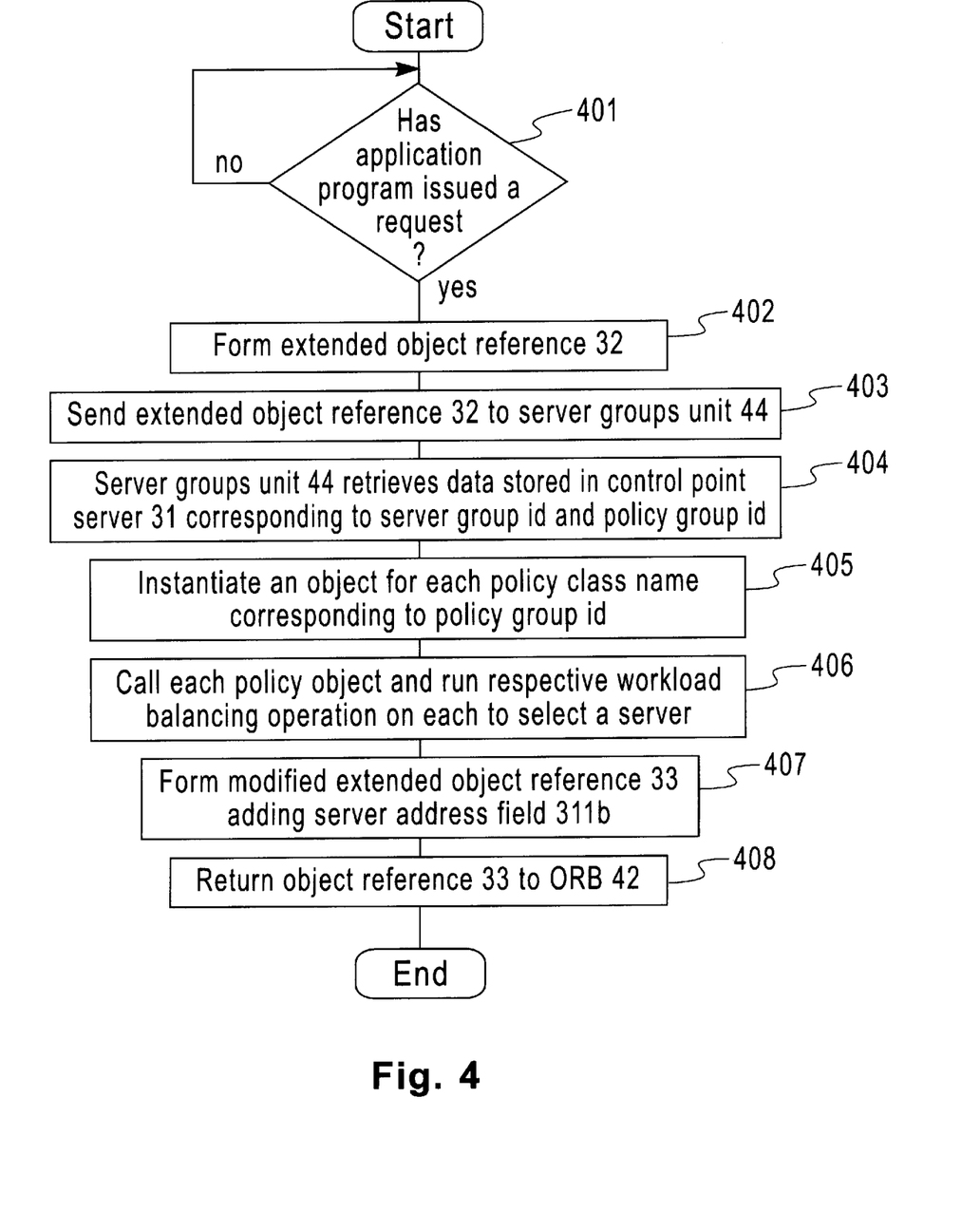
FIG. 4 is a flowchart showing the steps taken at the client, according to a preferred embodiment of the present invention.

In this case, steps 405 and 406 would still be carried out, but there would be no object instantiated (405) or run (406). The servers rankings would thus be all zeros and a built-in default policy, such as round robin by method, is used to select the first server first, the next server second etc.

We claim:

1. A method of performing workload management within an object-oriented client/server computing environment wherein one of a plurality of servers is chosen to satisfy a client request based on at least one workload management policy, said method, which takes place within the client, including steps of:

deciding whether a client application program has issued a request for a server to do some work;

forming an extended object reference based on said request, said extended object reference having, in addition to a server address field and an object key field, at least one additional field;

accessing workload management policy data based on said extended object reference; and selecting one of said plurality of servers based on said accessed workload management policy data.

2. The method of claim 1, wherein said extended object reference includes a server group identifier and a policy group identifier.

3. The method of claim 2, wherein said policy group identifier identifies said at least one workload management policy.

4. The method of claim 3, wherein said selecting step involves instantiating an object for each workload management policy identified by said policy group identifier.

5. A computer-readable memory comprising a data structure for an object reference for use in an object-oriented client/server computing system, said data structure comprising:

a server address field;

an object key field;

a server group identifier field; and a policy group identifier field.

6. The computer-readable memory of claim 5 wherein said server group identifier field identifies a group of servers, each server of said group capable of satisfying a particular client request associated with said object reference.

7. The computer-readable memory of claim 6 wherein said policy group identifier field identifies at least one workload management policy for selecting one server in said group of servers to satisfy said client request.

8. A computer program product stored on a computer readable storage medium at a client end of an object-oriented client/server computing system, said computer program product comprising:

client application program means for performing a client-side work item, and, in the process of which, making a client request for a server to perform at least part of said work item;

proxy object means for forming a proxy object in response to said client request;

object request broker means for communicating said client request from said proxy object to a server object; and server groups unit means for receiving an extended object reference from said object request broker means, using workload management policy data identified in said extended object reference to select a server from a group of servers, and informing said object request broker means of the selected server.

9. The computer program product of claim 8, wherein said extended object reference includes:

a server address field;

an object key field;

a server group identifier field; and a policy group identifier field.

10. The computer program product of claim 9 wherein said server group identifier field identifies said group of servers.

11. The computer program product of claim 10 wherein said policy group identifier field identifies at least one workload management policy for use by said server groups unit means in selecting a server in said group of servers to satisfy said client request.

12. The computer program product of claim 11 wherein said server groups unit means instantiates an object for each policy identified by said policy group identifier, while selecting a server in said group of servers to satisfy said client request.

13. A client computer device for use in an object-oriented client/server computing system, said computer device comprising:

client application program means for performing a client-side work item, and, in the process of which, making a client request for a server to perform at least part of said work item;

proxy object means for forming a proxy object in response to said client request;

object request broker means for communicating said client request from said proxy object to a server object; and server groups unit means for receiving an extended object reference from said object request broker means, using workload management policy data identified in said extended object reference to select a server from a group of servers, and informing said object request broker means of the selected server.

14. The computer device of claim 13, wherein said extended object reference includes:

a server address field;

an object key field;

a server group identifier field; and a policy group identifier field.

15. The computer device of claim 14 wherein said server group identifier field identifies said group of servers.

16. The computer device of claim 15 wherein said policy group identifier field identifies at least one workload management policy for use by said server groups unit means in selecting a server in said group of servers to satisfy said client request.

17. The computer device of claim 16 wherein said server groups unit means instantiates an object for each policy identified by said policy group identifier, while selecting a server in said group of servers to satisfy said client request.

* * * * *